US008392882B2

(12) United States Patent
Harris et al.

(10) Patent No.: US 8,392,882 B2
(45) Date of Patent: Mar. 5, 2013

(54) ENGINE STATE-BASED CONTROL OF SOFTWARE FUNCTIONS

(75) Inventors: James W. Harris, Galveston, IN (US); Sean P. Oilar, Brookston, IN (US)

(73) Assignee: Caterpillar Inc., Peoria, IL (US)

( * ) Notice: Subject to any disclaimer, the term of this patent is extended or adjusted under 35 U.S.C. 154(b) by 1829 days.

(21) Appl. No.: 11/605,948

(22) Filed: Nov. 30, 2006

(65) Prior Publication Data

US 2008/0133105 A1 Jun. 5, 2008

(51) Int. Cl.
*G06F 9/44* (2006.01)
*G06F 7/00* (2006.01)
*G06F 17/00* (2006.01)

(52) U.S. Cl. .......... 717/120; 717/121; 717/127; 701/36; 701/54

(58) Field of Classification Search ........................ None
See application file for complete search history.

(56) References Cited

U.S. PATENT DOCUMENTS

| | | | | |
|---|---|---|---|---|
| 4,668,872 | A | 5/1987 | Lerouge et al. | |
| 5,091,856 | A | 2/1992 | Hasegawa et al. | |
| 5,133,319 | A | 7/1992 | Ikeda et al. | |
| 5,369,584 | A | 11/1994 | Kajiwara | |
| 5,481,456 | A | 1/1996 | Ogura | |
| 5,809,434 | A * | 9/1998 | Ashrafi et al. | 701/1 |
| 6,038,500 | A | 3/2000 | Weiss | |
| 6,052,632 | A | 4/2000 | Iihoshi et al. | |
| 6,092,006 | A | 7/2000 | Dominke et al. | |
| 6,154,688 | A | 11/2000 | Dominke et al. | |
| 6,292,741 | B1 | 9/2001 | Bitzer et al. | |
| 6,351,692 | B1 | 2/2002 | Eaton et al. | |
| 6,421,593 | B1 | 7/2002 | Kempen et al. | |
| 6,463,373 | B2 | 10/2002 | Suganuma | |
| 6,470,252 | B2 | 10/2002 | Tashiro et al. | |
| 6,479,908 | B1 * | 11/2002 | Utter et al. | 307/10.3 |
| 6,553,297 | B2 | 4/2003 | Tashiro et al. | |
| 6,555,929 | B1 | 4/2003 | Eaton et al. | |
| 6,622,074 | B1 | 9/2003 | Coelingh et al. | |
| 6,633,799 | B2 | 10/2003 | Krakovich et al. | |
| 6,654,648 | B2 | 11/2003 | Nada et al. | |
| 6,700,356 | B1 | 3/2004 | Dorn | |
| 6,701,221 | B1 | 3/2004 | Eaton et al. | |
| 6,710,467 | B2 | 3/2004 | Braun et al. | |
| 6,731,098 | B1 | 5/2004 | Hintz et al. | |
| 6,735,502 | B2 * | 5/2004 | Phillips et al. | 701/22 |

(Continued)

FOREIGN PATENT DOCUMENTS

| | | | |
|---|---|---|---|
| EP | 0518 289 | A1 | 12/1992 |
| EP | 1 403 129 | A2 | 3/2004 |

(Continued)

OTHER PUBLICATIONS

PCT International Search Report; PCT/US2007/023195; Filing Date: Nov. 2, 2007; Applicant: Caterpillar Inc.

*Primary Examiner* — Thuy Dao
(74) *Attorney, Agent, or Firm* — Finnegan, Henderson, Farabow, Garrett & Dunner LLP

(57) ABSTRACT

Systems and methods provide engine state-based control of software functions. In one implementation, a system is provided that includes an engine and an engine control module. The engine control module determines a state of the engine and stores the determined state as an engine state variable. The engine state variable is interpretable by a plurality of components.

18 Claims, 4 Drawing Sheets

200

U.S. PATENT DOCUMENTS

| | | | | |
|---|---|---|---|---|
| 6,784,563 | B2 | 8/2004 | Nada | |
| 6,810,314 | B2 | 10/2004 | Tashiro et al. | |
| 6,816,764 | B2 | 11/2004 | Coelingh et al. | |
| 6,856,877 | B2 | 2/2005 | Coelingh et al. | |
| 6,859,708 | B2 | 2/2005 | Hashimoto et al. | |
| 6,892,126 | B2 | 5/2005 | Tashiro et al. | |
| 7,047,117 | B2 | 5/2006 | Akiyama et al. | |
| 7,197,382 | B2 * | 3/2007 | Prema et al. | 701/22 |
| 7,669,185 | B2 * | 2/2010 | Vrancic et al. | 717/121 |
| 7,849,449 | B2 * | 12/2010 | Andrade et al. | 717/127 |
| 7,996,135 | B2 * | 8/2011 | Ishii et al. | 701/54 |
| 2002/0016659 | A1 | 2/2002 | Tashiro et al. | |
| 2002/0128748 | A1 | 9/2002 | Krakovich et al. | |
| 2002/0161495 | A1 * | 10/2002 | Yamaki | 701/33 |
| 2002/0177931 | A1 * | 11/2002 | Iwasaki et al. | 701/36 |
| 2002/0183911 | A1 | 12/2002 | Tashiro et al. | |
| 2003/0018422 | A1 | 1/2003 | Akiyama | |
| 2003/0225495 | A1 | 12/2003 | Coelingh et al. | |
| 2003/0225496 | A1 | 12/2003 | Coelingh et al. | |
| 2004/0021323 | A1 | 2/2004 | Lee | |
| 2004/0044443 | A1 | 3/2004 | Eriksson | |
| 2004/0064220 | A1 | 4/2004 | Kobayashi | |
| 2004/0133879 | A1 * | 7/2004 | Yoshimura et al. | 717/120 |
| 2005/0113988 | A1 | 5/2005 | Nasr et al. | |
| 2005/0114007 | A1 | 5/2005 | Pillar et al. | |
| 2005/0211479 | A1 | 9/2005 | Tamor | |
| 2006/0015231 | A1 | 1/2006 | Yoshimura et al. | |
| 2006/0069487 | A1 | 3/2006 | Sychra et al. | |
| 2006/0069488 | A1 | 3/2006 | Sychra et al. | |
| 2006/0122737 | A1 | 6/2006 | Tani et al. | |
| 2006/0212178 | A1 * | 9/2006 | Yoshimura et al. | 701/1 |
| 2007/0271551 | A1 * | 11/2007 | Zurawka et al. | 717/120 |
| 2009/0037060 | A1 * | 2/2009 | Carlhammar et al. | 701/54 |
| 2009/0083709 | A1 * | 3/2009 | Millett et al. | 717/120 |

FOREIGN PATENT DOCUMENTS

| | | |
|---|---|---|
| WO | WO 03/100362 | 12/2003 |

* cited by examiner

ENGINE STATE-BASED CONTROL OF SOFTWARE FUNCTIONS

TECHNICAL FIELD

The present disclosure relates generally to engine states, and more particularly, to a system and computer-implemented method that provides engine state-based control of software functions.

BACKGROUND

A modern machine (e.g., a fixed and mobile commercial machine, such as a construction machine, fixed engine system, marine-based machine, etc.) includes various systems for performing machine operations and for controlling the machine's engine. For example, a machine engine may manage or monitor different engine parameters, such as coolant temperature and oil pressure, using software modules. In order for the software modules to carry out their management or monitoring functions, the software modules may need to know a state of the engine. Examples of engine states include "running" and "cranking," for example. Each of the software modules may determine the state of the engine using engine data, such as engine speed, for example. Although a particular software module may determine the state of the engine using the same data as another software module, each module may independently determine the state of the engine using different criteria.

For example, a temperature control module and an oil pressure control module might need to determine whether the engine is "running" or "cranking" to perform certain functions. However, upon receiving a particular RPM value of the engine (e.g., 400 RPM), the temperature control module may determine that the engine is "running," while the oil pressure module may arrive at an different conclusion based on the same RPM value. This discrepancy may occur because the RPM threshold used by the modules may differ (e.g., it may be acceptable for the oil pressure control module to consider an RPM value between 300-500 as an indication that the engine is "running," but the temperature control module may have a lower RPM range). Thus, discrepancies often occur when software modules independently determine the state of the engine using different criteria.

Furthermore, using different criteria to evaluate a state of the engine may reduce engine performance due to a lack of coordination and orchestration between sub-parts of an engine's control system architecture. For example, by having multiple software modules each making a determination as to the state of the engine, some engine systems (e.g., supervisory engine control systems) may each require complex connections to access necessary hardware (e.g., sensors providing engine data). Having multiple systems independently determine engine state requires extra processing resources to perform duplicative computations. Accordingly, the engine's control system architecture is unnecessarily complex from both a software and a hardware standpoint.

A vehicle integrated control system is described in U.S. Patent Application Publication No. 2004/0064220 A1 (the '220 publication) to Kobayashi, which published issued on Apr. 1, 2004. The '220 publication describes a vehicle integrated control system that includes a plurality of electronic control units coupled to an intra-vehicle communications network. The intra-vehicle communications network includes programs for controlling an operation of a plurality of functional elements of the vehicle and a vehicle coordinator for transmitting operation commands to the control programs. Although the system of the '220 publication may use a vehicle coordinator for transmitting operation commands, the system does not provide central functionality for determining engine state so that components do not independently determine engine state. Further, the system of the '220 publication does address the problem of engine state discrepancies that may occur between different components that each individually determine engine state. The disclosed embodiments are directed to overcoming one or more of the problems set forth above.

SUMMARY OF THE INVENTION

In one aspect, the present disclosure is directed to a system for providing engine state-based control of software functions. The system may include an engine and an engine control module. The engine control module may determine a state of the engine and store the determined state as an engine state variable. The engine state variable may be interpreted by a plurality of components.

In another aspect, the present disclosure is directed to a method for providing software-based control of an engine. The method may determine, by an engine control module, a state of the engine. The method may further store the determined state as an engine state variable. The engine state variable may be interpreted by a plurality of components.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
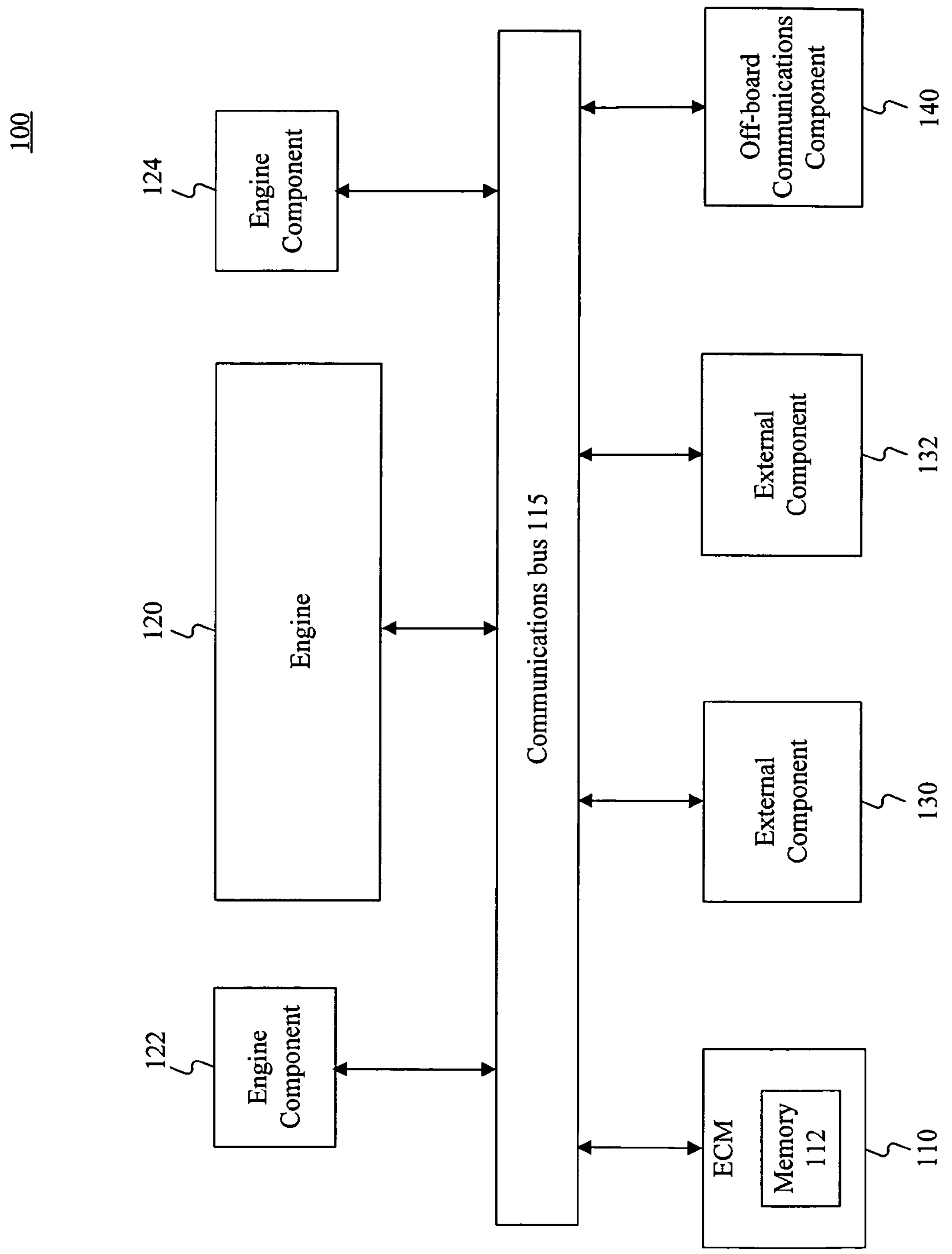
FIG. 1 is an exemplary system for providing engine state-based control of software functions, consistent with a disclosed embodiment.

FIG. 1 is an exemplary system 100 for providing engine state-based control of software functions, consistent with a disclosed embodiment. System 100 may represent a combination of software and hardware components included in a machine (not shown). As used herein, the term "machine" refers to a fixed or mobile machine that performs some type of operation associated with a particular industry, such as mining, construction, farming, etc., and operates between or within work environments (e.g., construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving machines, mining machines, backhoes, material handling equipment, farming equipment, marine vessels, aircraft, and any type of movable machine that operates in a work environment.

System 100 may include an engine control module (ECM) 110, which controls operations of engine 120 and determines a state of engine 120. Engine states are discussed in further detail in connection with FIG. 2. ECM 110 may communicate with engine components 120-124, external components 130-132, or off-board communications component 140 via communications bus 115. Although FIG. 1 depicts two engine components 120-124, two external components 130-132, and one off-board communications component 140, one of ordinary skill in the art will appreciate that the number of components shown in FIG. 1 is illustrative and additional components may be included in system 100.

Engine 120 may be any appropriate type of engine for operating a machine. For example, engine 120 may be a diesel, gasoline, or natural gas driven internal combustion engine. For example, disclosed embodiments may be implemented consistent with large engine platforms, such as models 3500, G3500, C175, CG175, 3600, and C280, for example, provided by Caterpillar Inc. Alternatively, engine 120 may be an electrical power engine.

ECM 110 may include one or more hardware and/or software components for controlling and/or monitoring operations of engine 120. For example, ECM 110 may include a processor (not shown) and a memory 112 storing software for regulating and/or controlling engine operations. In one embodiment, the software may include modules that store program instructions for determining a state of engine 120. The engine state may be stored as an engine state variable in memory 112. Further, the determined state of engine 120 may be used by ECM 110, engine components 120-124 and/or external components 130-132. Software modules for determining a state of engine 120 and the engine state variable are discussed in further detail in connection with FIG. 3.

ECM 110 may communicate with one or more engine components 122-124 that manage or monitor different engine parameters, such as RPM, temperature, oil pressure, speed, etc. Engine components 122-124 may comprise any combination of hardware, sensors, controllers, and/or software. For example, engine component 122 may include a temperature control software module for determining and regulating engine temperature and engine component 124 may include an oil pressure control software module for determining and regulating oil pressure.

ECM 110 may communicate with one or more external components 130-132 that request engine state information from ECM 110. External components 130-132 may comprise any combination of hardware, sensors controllers, and/or software modules. For example, external components 130-130 may be systems that require engine state information, but are not directly related to engine operations (e.g., other on-board machine systems, such as systems for controlling machine attachments or operator display systems, for example).

ECM 110 may communicate with off-board systems using off-board communications component 140. Off-board communications component 140 may format state information into any appropriate format, as needed, for transmission to off-board systems. Transmission to off-board systems may be accomplished wirelessly over an antenna (not shown), for example. Wireless communications may include satellite, cellular, infrared, and any other type of wireless communication. Alternatively, off-board communications component 140 may directly interface with an off-board system through a data port (not shown), such as an Ethernet port. For example, an Ethernet port may deliver a message to an external device (not shown) that is connected to the data port. The external device may then transmit the response over one of many different networks (e.g., cellular, satellite, 802.11, etc.).

ECM 110 may communicate with engine components 122-124 and external components 130-132 via communications bus 115. ECM 110 may also receive data from and transmit data to off-board systems using off-board communications component 140, which is available over communications bus 115. Communications bus 115 may be proprietary or non-proprietary, and may include manufacturer-based data links and communication paths based on known industry standards (e.g., J1939, RS232, RP 1210, RS-422, RS-485, MODBUS, CAN, etc.).

In operation, ECM 110 manages or controls an operating state of engine 120, including controlling starting and shutdown sequences for starting and shutting down motors. To facilitate a central approach to engine state information, ECM 110 may determine a state of the engine, which may be stored by ECM 110 (e.g., in memory 112) or may be transmitted to internal control systems (e.g., engine components 120-122) and/or external control systems (e.g., external components 130-132). Accordingly, ECM 110 may determine a state of engine 120 centrally and the determined engine state may be used by one or more of engine components 122-124 and/or external components 130-132 that require engine state information. Thus, the amount of program code across components is reduced, hardware connections are reduced, performance is increased, and discrepancies between components are eliminated due to a centralized approach.

In order to determine a state of engine 120, ECM 110 receives data from different parts of the engine (e.g., engine components 122-124) and determines an engine state based on an analysis of the received data. The determined engine state is then communicated to any other components, such as any software modules of engine components 122-124 and/or external components 130-32, that require engine state information. Accordingly, the software in these components are relieved from individually making an engine state determination.

Figure 2:
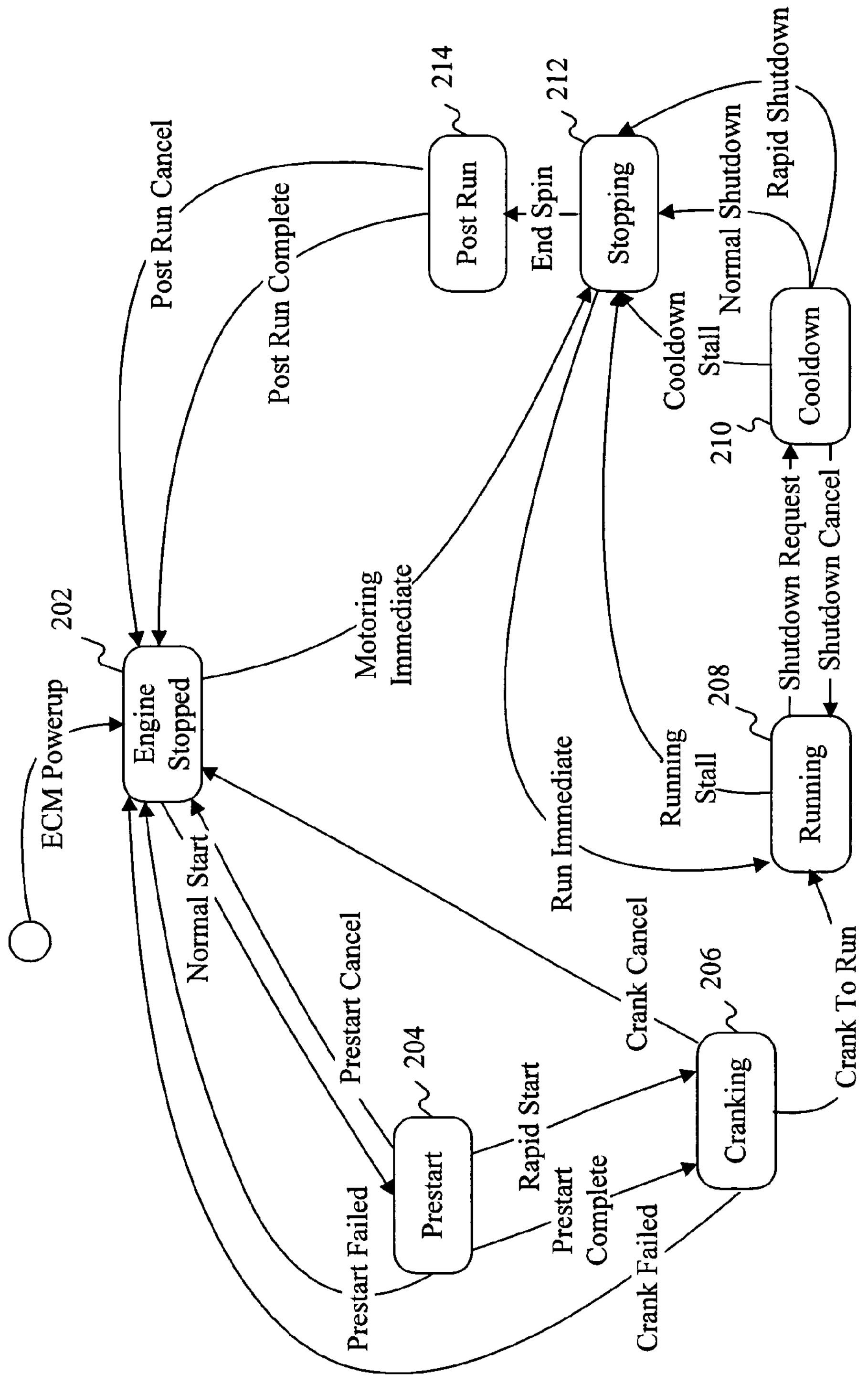
FIG. 2 is an exemplary state diagram of an engine, consistent with a disclosed embodiment.

FIG. 2 is an exemplary state diagram 200 of engine 120, consistent with a disclosed embodiment. State diagram 200 illustrates state changes that may occur for engine 120 during normal operation. Available states include an engine stopped state 202, a prestart state 204, a cranking state 206, a running state 208, a cool down state 210, a stopping state 212, and a post run state 214.

From engine stopped state 202, engine 120 may transition to prestart state 204 during a “normal start” transition. Engine 120 may also transition from engine stopped state 202 to stopping state 212. From prestart state 204, engine 120 may transition to engine stopped state 202 in the event of a “prestart failed” or “prestart canceled” transition. Further, from prestart state 204, engine 120 may transition to cranking state 206 when prestart is complete.

From cranking state 206, engine 120 may transition to engine stopped state 202 when engine cranking is canceled. Further, engine 120 may transition from cranking state 206 to running state 208. From running state 208, engine 120 may transition to cool down state 210 in the event of a shutdown request. Further, engine 120 may transition from running state 208 to stopping state 212 in the event of a stall.

From cool down state 210, engine 120 may transition to running state 208 in the event of a canceled shutdown. Further, engine 120 may transition from cool down state 210 to stopping state 212 during a “normal” or “rapid shutdown”

transition. From stopping state 212, engine 120 may transition to post run state 214. From post run state 214, engine 120 may transition to engine stopped state 202 when post run is complete or canceled.

The following discussion pertains to exemplary transitions of engine 120 from one state to another state. Upon determining the engine 120 has transitioned to a new state, ECM 110 may update state information (e.g., an engine state variable) stored in memory 112 to indicate whether engine 120 is operating in engine stopped state 202, prestart state 204, cranking state 206, running state 208, cool down state 210, stopping state 212, or post run state 214.

In stopped state 202, ECM 110 is powered on and engine 120 is not producing power. For example, engine 120 may be turning due to being motored in either direction by driven equipment or due to its own inertia. A "normal" transition from stopped state 202 to prestart state 204 occurs when all of the following become true in the following order of priority. Specifically, (1) an engine rotating interlock (e.g., one of engine components 120-122, for example) is not reporting "inhibited"; (2) a rapid start request component of engine 120 is reporting a "normal start"; and (3) an operator's desired engine state transition is from "stop" to "run." Further, a "motoring intermediate" transition may occur when engine 120 transitions from engine stopped state 202 to stopping state 210.

In prestart state 204, software stored in memory 112 executes necessary processes to prepare engine 120 for cranking and starting. These processes may include controlling priming, prelubrication, preheading sequences, interlocks, or other starting processes. The "prestart complete" transition from prestart state 204 to cranking state 206 occurs when the following are true in the following order of priority. Specifically, (1) the engine rotating interlock component is not reporting inhibited and (2) all involved subsystems indicate readiness by returning a status of "complete" or "disabled."

Further, in prestart state 204, ECM 110 commands a "prestart cancel" transition when the operator's desired engine state becomes "stop." In prestart state 204, the "prestart failed" transition occurs when any involved subsystem reports a status of "failed" to ECM 110 and the engine rotating interlock component reports "inhibited" after all other conditions for the prestart complete transition are met. The "rapid start" transition provides a means to start the engine without completing a prestart sequence, when such functionality is available for engine 120.

The "crank to run" transition occurs when the following are true in the following order of priority. Specifically, the transition occurs when (1) the engine rotating interlock component is not reporting "inhibited" and (2) a rapid start requesting function is reporting "start rapid."

Cranking state 206 is defined by a range of engine speeds between zero and a threshold where engine 120 may accelerate to a lowest idle speed. The "crank to run" transition occurs when engine position sensing logic is synchronized to engine position (this check inherently includes a check that the engine is not turning in the incorrect direction) and engine speed is greater than or equal to a "crank to run speed higher threshold." The "crank cancel" transition occurs when the operator's desired engine state is "stop." The "crank failed" transition to engine stopped state 202 occurs if a cranking motor control component indicates a status of "failed." The "crank canceled" transition occurs when the operator's desired state is changed to "stop."

Engine 120 remains in running state 208 during normal operation when it is idling or producing usable power. The "running stall" transition occurs when the engine speed falls below an "engine crank to run speed lower threshold" and the operator's desired engine state does not change to "stop." Stalls may be caused by any number of conditions where the engine power developed is not enough to meet the sum of the engine load, such as when the engine runs out of fuel, for example. The "shutdown request" transition occurs when the operator's desired engine state becomes "stop." The "run intermediate" transition is used to recover from a running reset or to allow engine 120 to start via a manual crank sequence. The "run intermediate" transition occurs when the desired engine state is "run," the engine position sensing logic is synchronized to the engine's position, and the engine speed is greater than or equal to a "crank to run speed higher threshold."

During cool down state 210, engine 120 operates at a reduced speed and/or load to allow engine 120 sufficient time to cool off before engine 120 is stopped. This action prevents damage to engine components due to a lack of lubrication and/or prevents damage due to cooling while engine 120 is still at a high operating temperature. The "normal shutdown" transition occurs when involved subsystems indicate readiness by returning a status of "complete" or "disabled," and the cool down module reports "complete." The "shutdown cancel" transition occurs when the desire engine state becomes "run." The "rapid shutdown" transition occurs immediately when engine rapid shutdown request function is reporting "shutdown rapid." The "cool down stall" transition occurs when engine speed falls below the "crank to run lower threshold" in the same manner as in running state 208.

During post run state 214, engine 120 is not running. Actions are taken during post run state 214 by various subsystems of engine 120 in order to prevent engine damage and extend component life. The "post run complete" transition occurs when all involved subsystems (for example, turbocharger post-lubrication) indicate a status of "disabled" or complete." The "post run cancel" transition allows for an immediate restart without waiting for the post run sequences to complete and occurs when "engine post run enabled" equals "allowed" and the engine rapid shutdown request function is reporting "shutdown rapid."

During stopping state 210, engine 120 is not producing power. Engine 120 may be turning due to being motored by driven equipment or its own inertia. Actions are taken during stopping state 210 by various subsystems in order to prevent engine damage and extend component life. The "end spin" transition occurs when engine speed reaches zero.

Figure 3:
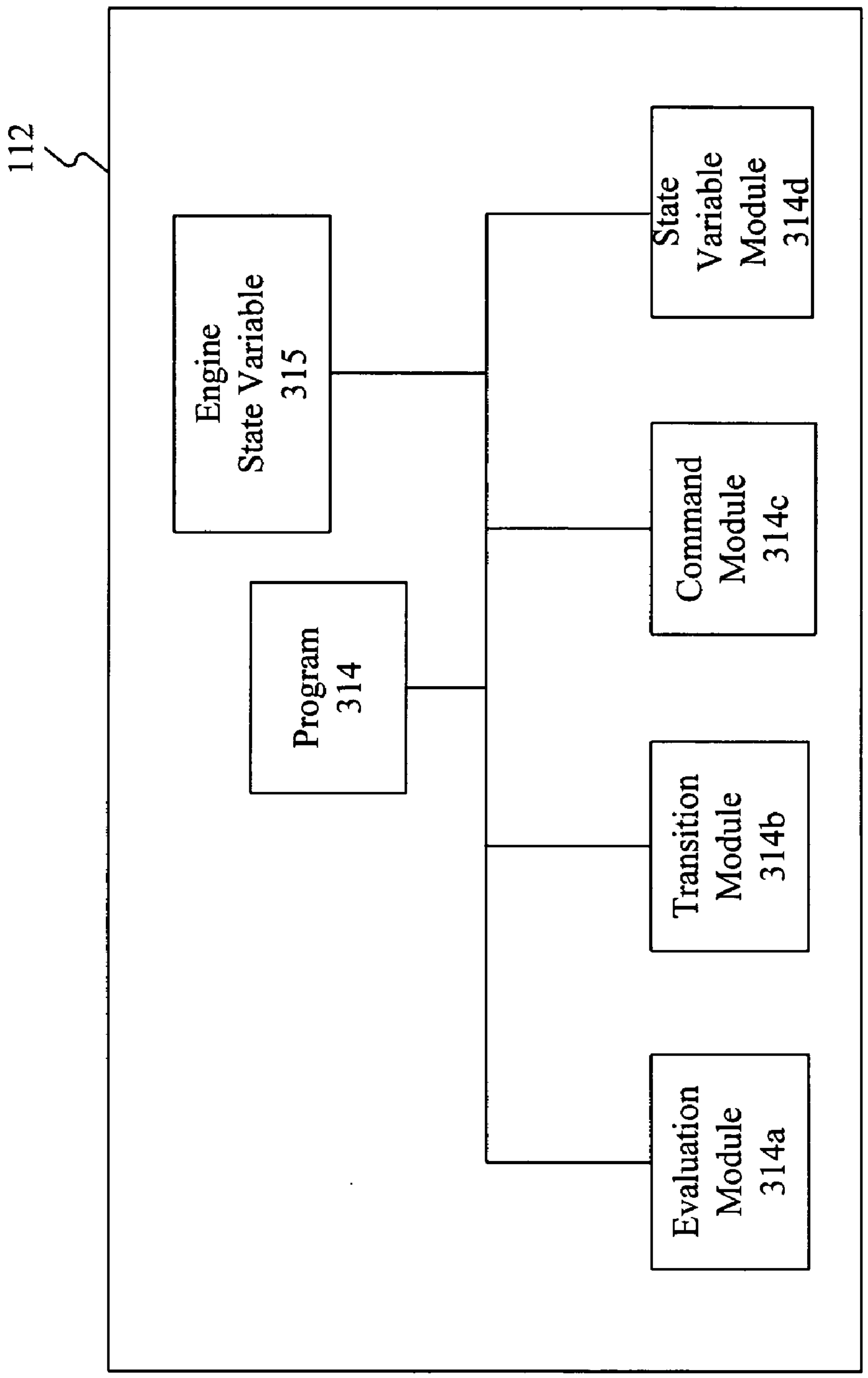
FIG. 3 is an exemplary software architecture for providing engine state-based control of software functions, consistent with a disclosed embodiment.

FIG. 3 is an exemplary software architecture for providing engine state-based control of software functions, consistent with a disclosed embodiment. The software architecture may be stored in memory 112, for example.

In one embodiment, memory 112 stores instructions of program 314, which when executed, perform a process to determine a state of engine 120. To do so, program 314 may include instructions in the form of one or more software modules 314*a*-314*d*. Software modules 314*a*-314*d* may be written using any known programming language, such as C++, XML, etc., and may include an evaluation module 314*a*, transition module 314*b*, command module 314*c*, and state variable module 314*d*. Furthermore, modules of program 314 may access an engine state variable 315, which stores a state of engine 210. For example, engine state variable 315 may store data representing one of the states discussed above in connection with FIG. 2 (i.e., engine stopped state 202, prestart state 204, cranking state 206, running state 208, cool down state 210, stopping state 212, or post run state 214).

Evaluation module 314*a* may determine a current state of engine 120. Evaluation module 314*a* may determine the current state by checking engine state variable 315. For example, upon receipt of a request from another system (e.g., engine components 120-122, external components 130-132), evaluation module 314*a* may access the current state of engine 120.

Transition module 314*b* may determine whether engine 120 has been commanded to undergo a state transition. Transition module 314*b* may evaluate criteria discussed above in connection with FIG. 2 for undergoing state transitions. For example, when engine 120 proceeds from engine stopped state 202 to prestart start 204, the engine rotating interlock is not reporting "inhibited"; a rapid start request component of engine 120 is reporting a "normal start"; and an operator's desired engine state transition is from "stop" to "run." The criteria may be monitored by transition module 314*b*, which may store data in memory 112 reflecting whether or not these criteria are met. Transition module 314*b* may evaluate the criteria by accessing data transmitted to ECM 110 via communications bus 115 from sensors and/or other hardware, for example.

Command module 314*c* may instruct engine 120 to undergo one or more transitions to achieve a desired state. For example, an operator may desire to transition engine 120 from "stop" to "run." In order to proceed from "stop" to "run," engine 120 transitions to prestart state 204, cranking state 206, and then running state 208. Accordingly, command module 314*c* may transmit instructions to software modules (e.g., engine components 120-122) necessary for commanding engine 120 to achieve engine state transition(s).

State variable module 314*d* may update engine state variable 315 to the current state. For example, engine state variable 315 may be stored in memory 112 of ECM 110. Alternatively, or in addition, engine state variable 315 may be stored in any appropriate one or more of engine components 122-124 and/or external components 130-132. For example, engine component 120 may be a controller capable of storing engine state variable 315.

Although program modules 314*a*-314*d* have been described above as being separate modules, one of ordinary skill in the art will recognize that functionalities provided by one or more modules may be combined.

Figure 4:
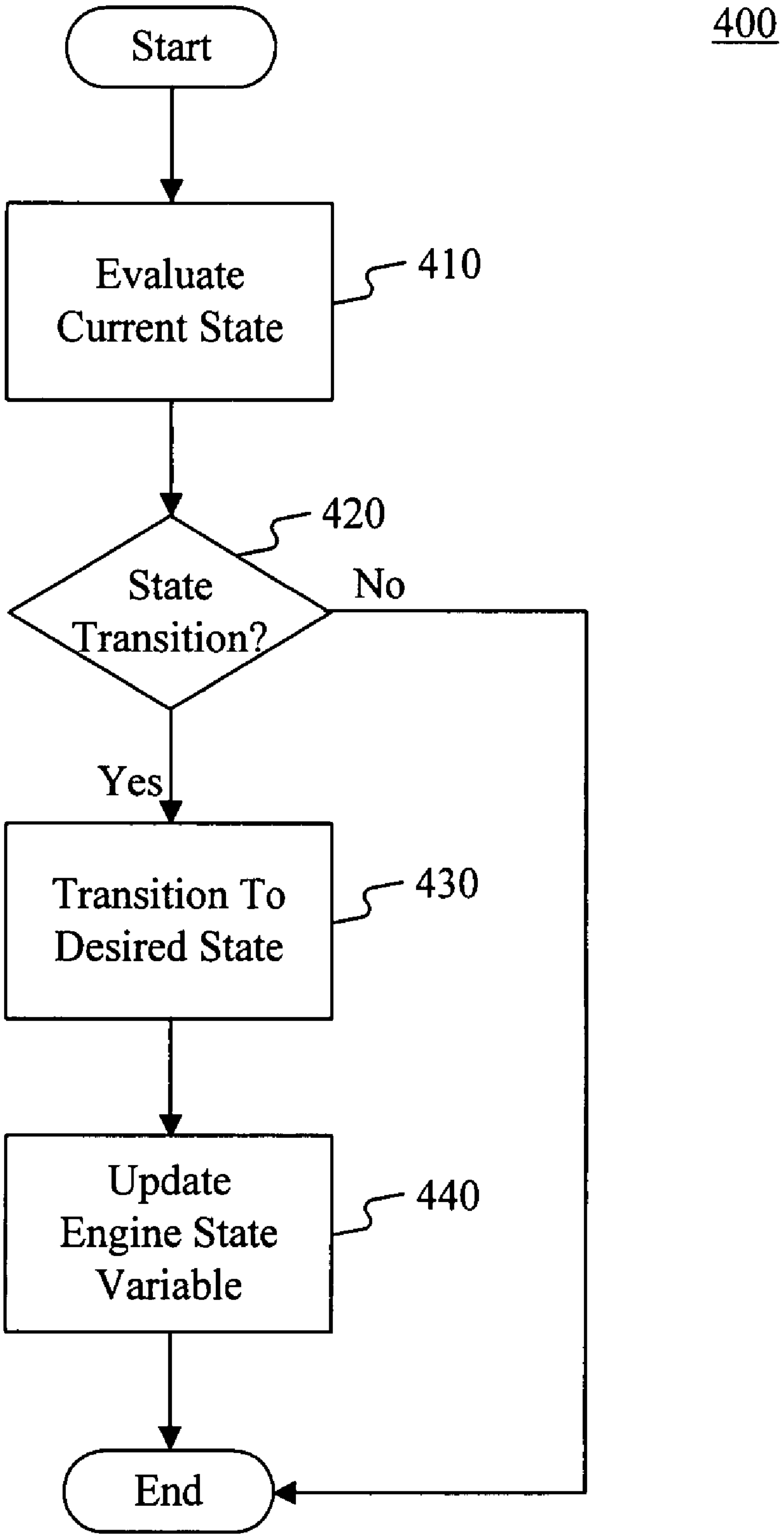
FIG. 4 is an exemplary method for determining a state of an engine, consistent with a disclosed embodiment.

FIG. 4 is an exemplary method 400 for determining a state of an engine, consistent with a disclosed embodiment. According to method 400, ECM 110 may manage or control operating states of engine 120, including control of starting and shutdown sequences and the control of the starting motors. Further, ECM 110 may control transitions from various states, as discussed above in connection with FIG. 2. Still further, ECM 110 may also update an engine state variable once engine transitions occur. Engine state variable 315 may be accessed by or stored by one or more of engine components 122-124 and/or external components 130-132.

As shown in FIG. 4, in step 410, ECM 110 evaluates a current state of engine 120. ECM 110 may evaluate the current state when evaluation module 314*a* checks engine state variable 315, which may be stored in memory 112, for example. Engine state variable 315 may indicate one of the following states: engine stopped state 202, prestart state 204, cranking state 206, running state 208, cool down state 210, stopping state 212, or post run state 214.

Next, in step 420, transition module 314*b* may determine whether engine 120 has been commanded to undergo a state transition. Transition module 314*b* may evaluate the criteria discussed above in connection with FIG. 2 for undergoing state transitions. For example, transition module 314*b* may evaluate criteria for a particular transition by examining data transmitted to ECM 110 via communications bus 115 from sensors and/or other hardware, for example. If engine 120 has been commanded to undergo a state transition, the process proceeds to step 430. However, if engine 120 has not been commanded to undergo a state transition, then the process ends.

In step 430, ECM 110 command module 314*c* may instruct engine 120 to undergo one or more transitions to achieve a desired state. Accordingly, command module 314*c* may interface with engine components 120-122 necessary for achieving the proper engine state transition. For example, command module 314*c* may require engine components 120-122 to operate to transition from stopped state 202 to running state 208, as set forth above.

Next, in step 340, state variable module 314*d* may update engine state variable 315 to the current state. For example, engine state variable 315 may be stored in memory 112 of ECM 110. Furthermore, engine state variable 315 may also be stored by ECM 110 in any appropriate one or more of engine components 122-124 and/or external components 130-132.

As one of ordinary skill in the art will appreciate, one or more of the above steps in the above processes may be optional and may be omitted from implementations in certain embodiments. Furthermore, after engine state variable 315 is updated, engine components 120-122 and/or external components 130-132 that need to know a state of engine 120 may access engine state variable 315. Alternatively, or in addition to storing engine state variable 315 in ECM 110, engine state variable 315 may be transmitted via communications bus 115 for direct storage in any one of engine components 120-122 and/or external components 130-132. ECM 110 may transmit engine state variable 315 via communications bus 115 to engine components 120-122 and/or external components 130-132 when requested (i.e., on demand). For example, a particular one of engine components 120-122 and/or external components 130-132 may request the engine state (e.g., a display component may request the engine state for display on an operator display). As yet another example, a particular one of engine components 120-122 and/or external components 130-132 may request that ECM 110 transmit engine state variable 315 when it is updated (i.e., broadcast). Still further, engine state variable 315 may be transmitted via off-board communications component 140 to other systems on demand.

INDUSTRIAL APPLICABILITY

Disclosed embodiments manage or control an operating state of an engine, including control of starting and shutdown sequences and the control of starting motors. Further, an engine control module (ECM) may provide a single engine state control function and may centrally determine the engine state. The engine state may be used by external components and/or engine components that require engine state information. To facilitate a central approach to engine state information, the ECM may store an engine state variable. In order to determine the engine state, the ECM may receive data from different parts of the engine. The determined engine status may be communicated to any other software modules that require engine state information.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method executed by a processor for providing software-based control of an engine, the method comprising:

determining, by an engine control module, a state of the engine of a machine, the state of the engine being one of a set including at least a prestart state, a cranking state, and a stopping state, the determining comprising:

determining whether the engine has been commanded to undergo a state transition, and determining the state of the engine based on the state transition;

storing the determined state as an engine state variable, wherein the engine state variable is interpretable by a plurality of components and is stored in a memory of the engine control module; and transmitting the engine state variable to at least one of the plurality of components upon receiving a request from the at least one of the plurality of components, the plurality of components comprising at least one of an external component of the machine or an off-board communications component.

2. The method of claim 1, wherein upon storing the engine state variable, the method further comprising:

transmitting the engine state variable to the plurality of components.

3. The method of claim 1, wherein the plurality of components further comprise at least one engine component.

4. The method of claim 1, further comprising:

updating the engine state variable upon the state transition of the engine.

5. The method of claim 4, further comprising:

transmitting the updated engine state variable to one or more of the plurality of components.

6. The method of claim 1, wherein the plurality of components comprises the external component of the machine and the off-board communications component.

7. The method of claim 1, wherein the plurality of components comprises the off-board communications component.

8. A system having a processor for providing engine state-based control of software functions, the system comprising:

an engine of a machine; and an engine control module, the engine control module determining a state of the engine and storing the determined state as an engine state variable, the state of the engine being one of a predetermined number of states representative of overall operational states of the engine associated with at least prestarting, cranking, and stopping the engine, wherein the engine state variable is interpretable by a plurality of components and is stored in a memory of the engine control module;

wherein upon storing the engine state variable, the engine control module transmits the engine state variable to the plurality of components; and wherein the engine control module transmits the engine state variable to at least one of the plurality of components upon receiving a request from the at least one of the plurality of components, and the plurality of components comprise at least one of an external component of the machine or an off-board communications component.

9. The system of claim 8, wherein the plurality of components further comprise at least one engine component.

10. The system of claim 8, wherein the engine control module updates the engine state variable upon a state transition of the engine.

11. The system of claim 10, wherein the updated engine state variable is transmitted to one or more of the plurality of components.

12. The system of claim 8, wherein the plurality of components comprises the external component of the machine and the off-board communications component.

13. The system of claim 8, wherein the plurality of components comprises the off-board communications component.

14. A non-transitory computer-readable medium storing instructions executable by a processor for providing software-based control of an engine of a machine according to a method, the method comprising:

determining, by an engine control module, a state of the engine, the state of the engine being one of a set including at least a stopped state, a prestart state, a cranking state, and a stopping state;

storing the determined state as an engine state variable, wherein the engine state variable is interpretable by a plurality of components and is stored in a memory of the engine control module;

upon storing the engine state variable, transmitting the engine state variable to the plurality of components; and transmitting the engine state variable to at least one of the plurality of components upon receiving a request from the at least one of the plurality of components, the plurality of components comprising at least one of an external component of the machine or an off-board communications component.

15. The computer-readable medium of claim 14, wherein the plurality of components further comprise at least one engine component.

16. The computer-readable medium of claim 14, further comprising:

updating the engine state variable upon a state transition of the engine.

17. The computer-readable medium of claim 14, wherein the plurality of components comprises the external component of the machine and the off-board communications component.

18. The computer-readable medium of claim 14, wherein the plurality of components comprises the off-board communications component.

* * * * *